Oct. 4, 1955  D. C. HEITSHU  2,719,395
WINDROWER ATTACHMENT FOR TRACTORS
Filed Sept. 30, 1954  5 Sheets-Sheet 1
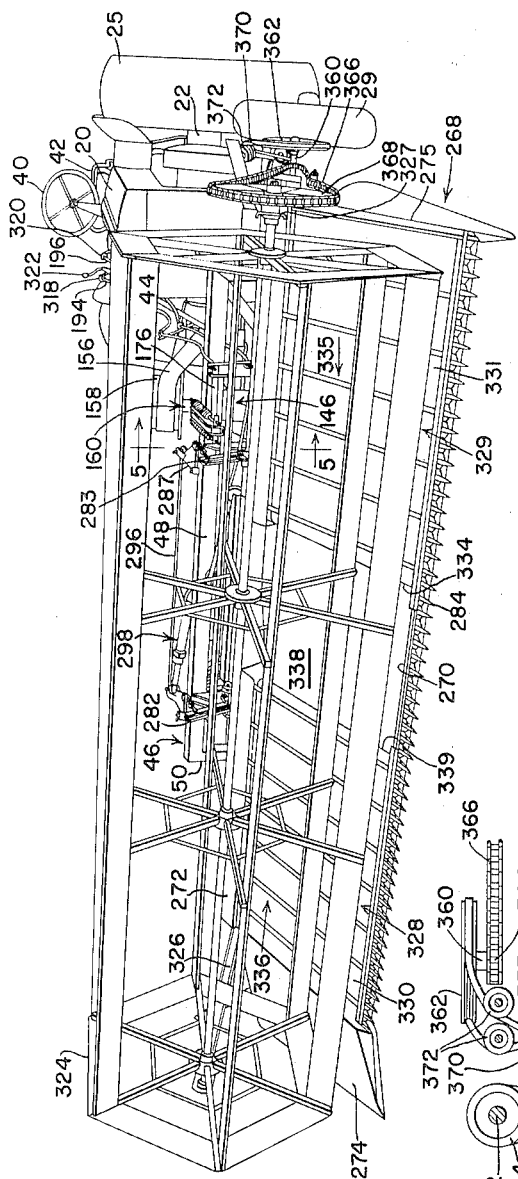
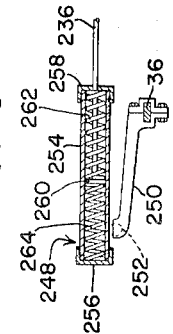
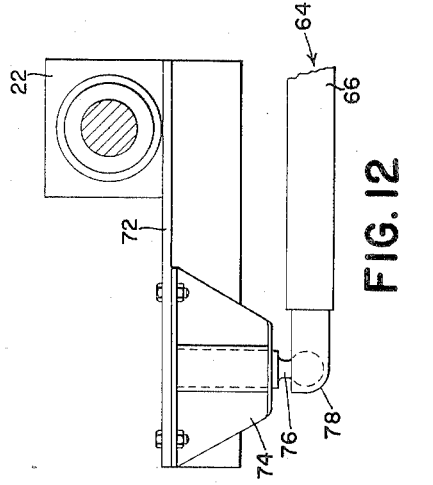
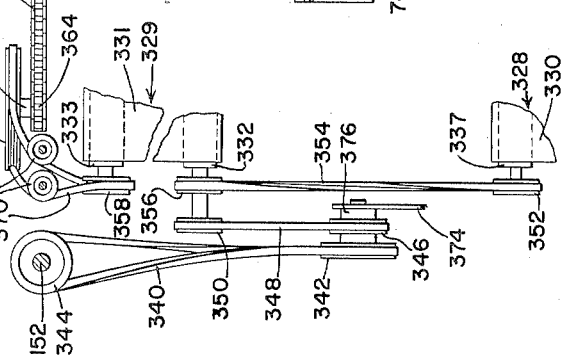
*INVENTOR.*
D. C. HEITSHU Oct. 4, 1955   D. C. HEITSHU   2,719,395
WINDROWER ATTACHMENT FOR TRACTORS
Filed Sept. 30, 1954   5 Sheets-Sheet 2

FIG. 2

INVENTOR.
D. C. HEITSHU

INVENTOR.
D. C. HEITSHU

Oct. 4, 1955   D. C. HEITSHU   2,719,395
WINDROWER ATTACHMENT FOR TRACTORS
Filed Sept. 30, 1954   5 Sheets-Sheet 4
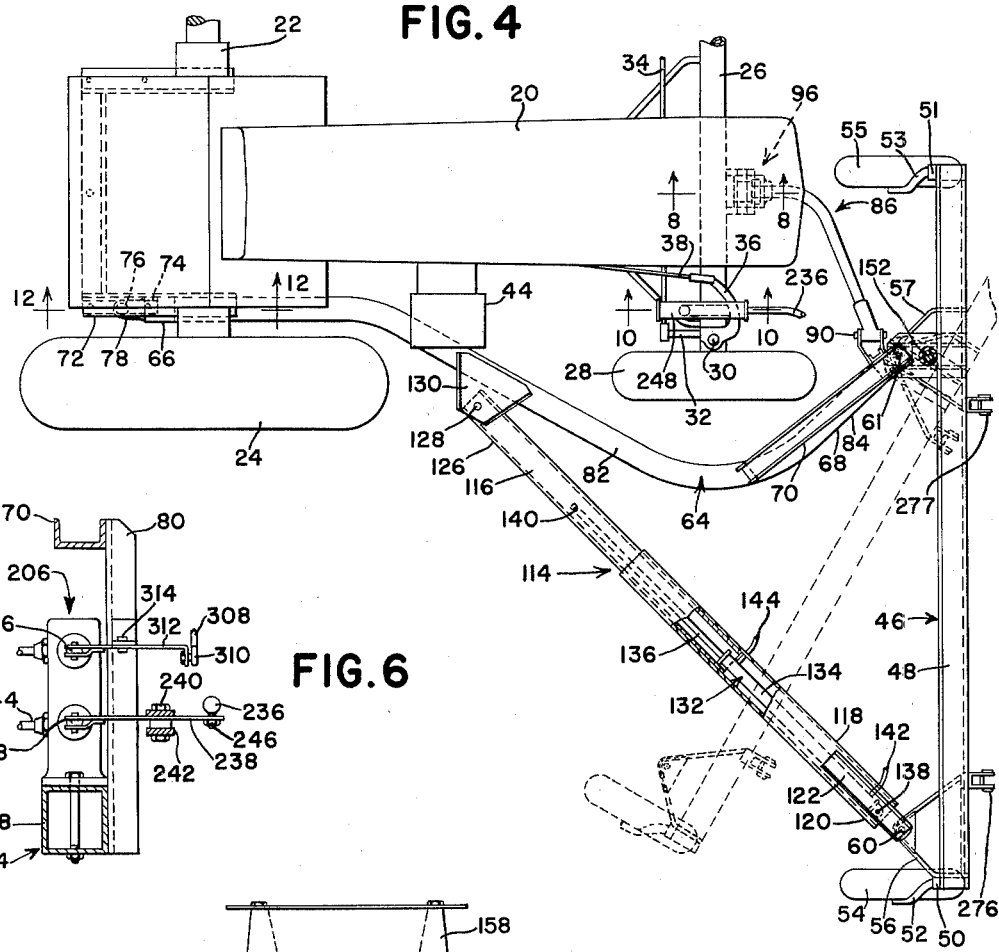
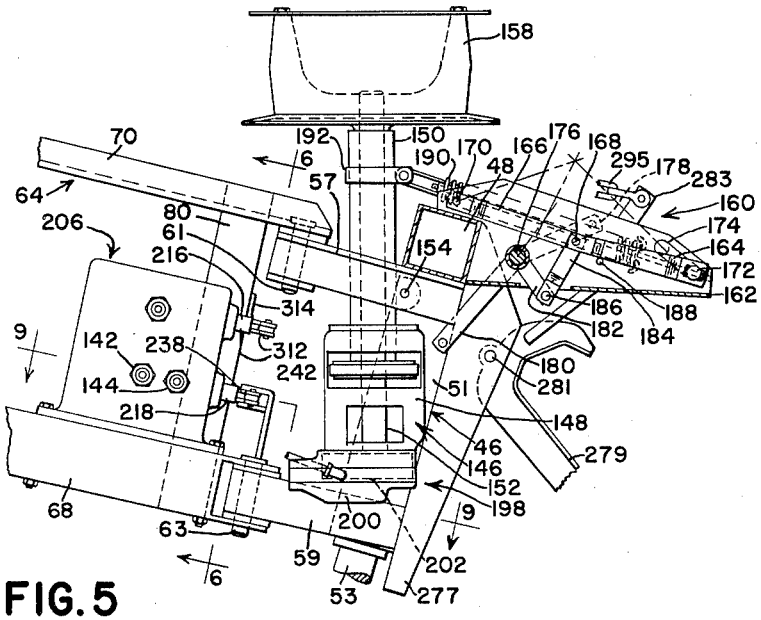
*INVENTOR.*
D. C. HEITSHU

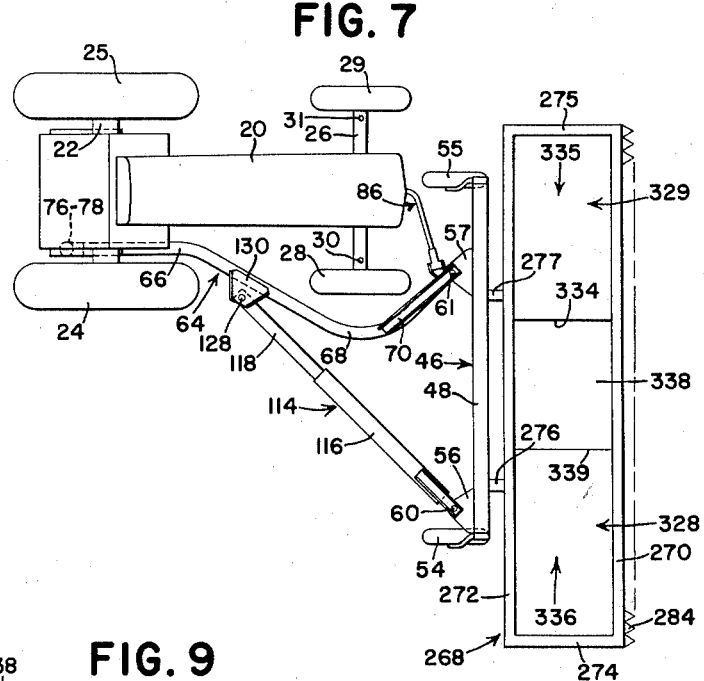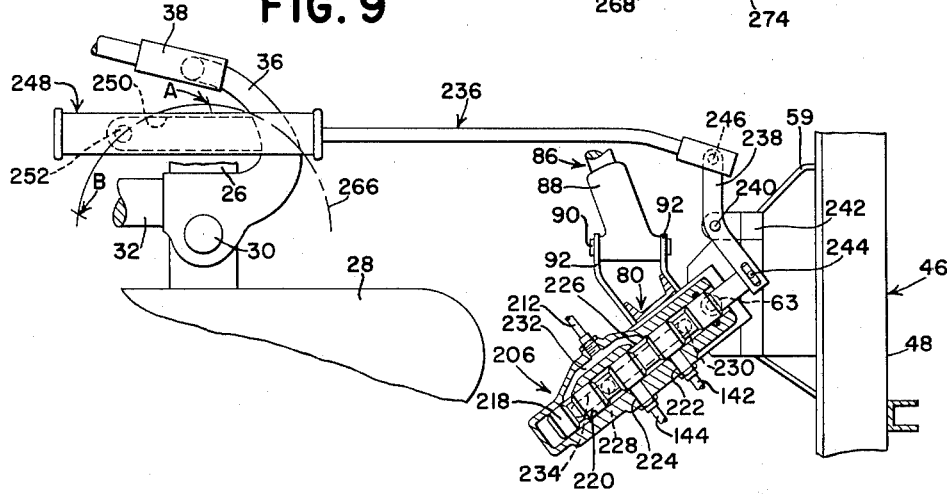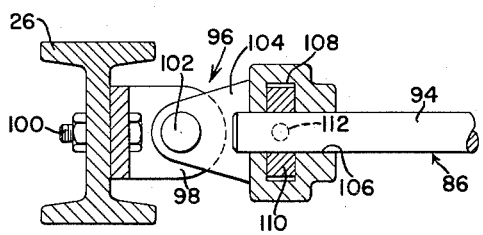

2,719,395

WINDROWER ATTACHMENT FOR TRACTORS

Daniel C. Heitshu, Moline, Ill., assignor to Deere & Company, Moline, Ill., a corporation of Illinois Application September 30, 1954, Serial No. 459,299

20 Claims. (Cl. 56—23)

This invention relates to an agricultural implement and more particularly to an implement of the type mounted at the forward end of and propelled by a tractor.

The design characteristics of a machine based on a preferred embodiment of the invention find particular utility in the tractor-mounted windrower or header, which is representative of an implement in which certain advantages are gained by pushing the implement or machine ahead of the tractor as distinguished from towing or otherwise mounting the machine at a rearward portion of the tractor. In the harvesting of grain, for example, one advantage of the pushed machine is that the tractor or other propelling vehicle does not run over the standing crop before it is cut. However, machines of this character present many problems, one of which is the discharging or windrowing of the cut grain in a path laterally offset to that traveled by the machine, since it is undesirable to have the tractor run over the windrowed grain. Another problem presented in front-mounted implements is that concerning the steering of the tractor-implement unit. In the mowing of grain, it is conventional to mow on the basis of straight line travel except at the corners, which are turned to the right. According to the present invention, a steerable implement is mounted on the tractor and the turning or steering thereof is operative in response to turning or steering of the tractor steerable wheels. In the case of a windrower, such as illustrated here, it is an object of the invention to provide a center delivery windrower that discharges the crops in a windrow to the right-hand side of the tractor wheels so that the windrow is not run over by the tractor.

The invention further features the provision of a novel frame supported on the tractor in such manner that it may be readily mounted on and dismounted from the tractor, together with driving means incorporating an input or driving member from which drive is taken to the various drivable parts of the machine. In the controlling of the machine for turning at corners, power-operated positioning means is utilized, preferably of the hydraulic type and preferably deriving power from a pump driven by the above mentioned input or driving means. In the utilization of the steering-responsive means, the invention features the provision of a device enabling turns to the right but inactive on turns to the left, together with follow-up means for disengaging the power-operated positioning means when the right-hand turn has been completed. The mechanism also utilizes lost-motion or overrunning means to accommodate differences in degree of movement of the tractor steerable wheel means and the control member that initiates actuation of the power-operated positioning means. Still further objects of the invention reside in supporting structure in the form of a thrust frame mounted on the tractor for vertical movement and associated with a stabilizer for guiding the vertical movement. The thrust frame and the associated stabilizer and brace means are of simple and economical construction and the brace means is extendable and retractable, a portion thereof being tubular to enclose a fluid motor for effecting operation of the harvester frame positioning means.

The foregoing and other desirable objects and important features inherent in and encompassed by the invention will become apparent as a preferred embodiment of the invention is disclosed in detail in the following specification and accompanying sheets of drawings, the several figures of which will be described immediately below.

Figure 1 is a front perspective view showing the overall arrangement.

Figure 2 is a fragmentary perspective view, on a scale enlarged over that of Figure 1, illustrating some of the details of construction.

Figure 4 is a plan view, with certain parts omitted, illustrating the association of the supporting frame with the tractor.

Figure 5 is a fragmentary sectional view, on an enlarged scale, as seen generally along the line 5—5 of Figure 1.

Figure 6 is a sectional view as seen along the line 6—6 of Figure 5.

Figure 7 is a plan view, largely schematic and reduced in scale as compared to Figure 4, illustrating the overall relationship of the implement and tractor.

Figure 8 is a fragmentary enlarged sectional view as seen along the line 8—8 of Figure 4.

Figure 9 is a fragmentary plan view, partly in section as seen along the line 9—9 of Figure 5, illustrating the relationship between the steering mechanism and the control means.

Figure 10 is an enlarged fragmentary sectional view as seen along the line 10—10 of Figure 4.

Figure 11 is a schematic plan view illustrating a portion of the drive for the drivable means of the machine.

Figure 12 is a fragmentary enlarged sectional view on the line 12—12 of Figure 4.

Figure 3:
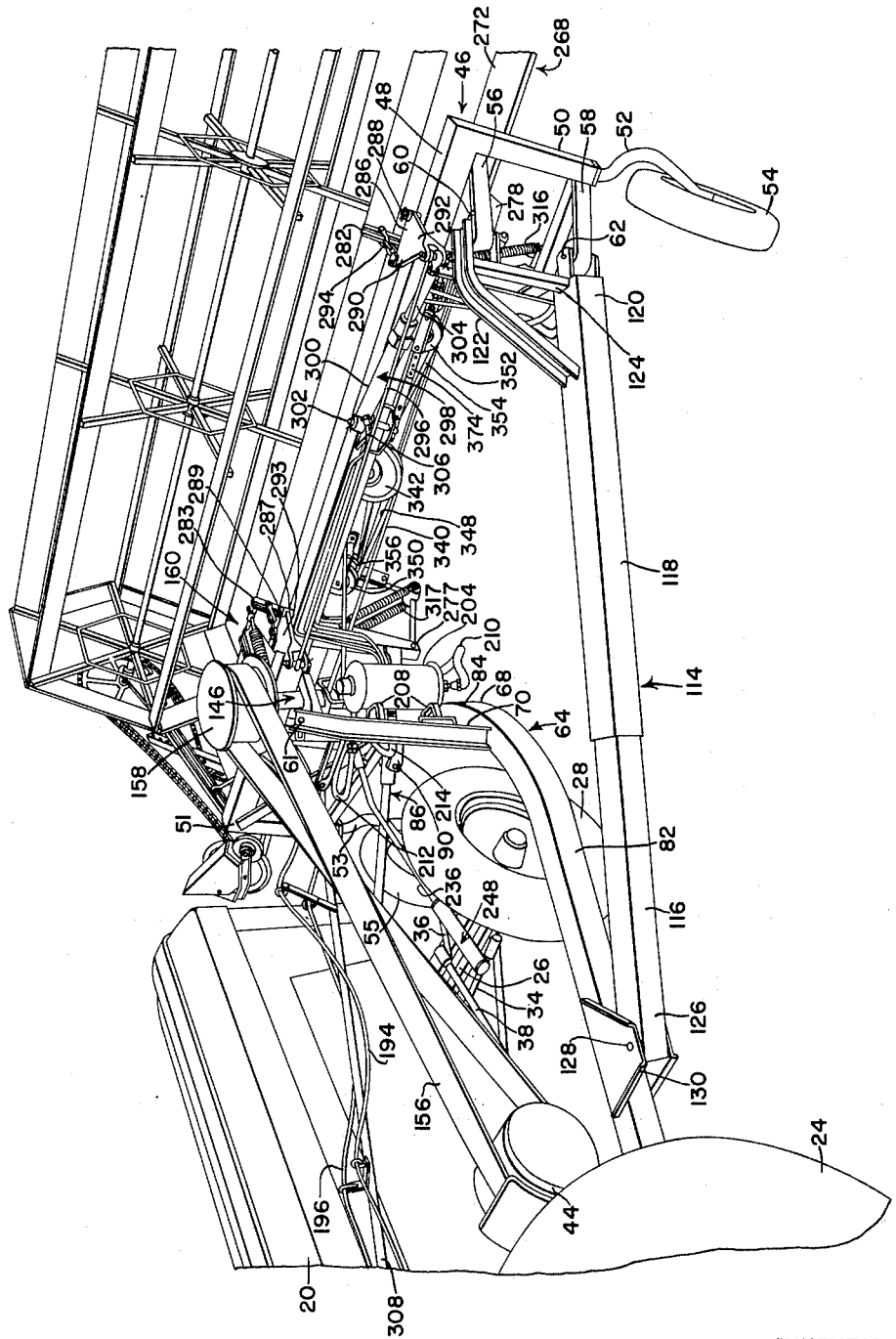
Figure 3 is a perspective view, slightly reduced in scale as compared to Figure 2, showing other details of construction.

The tractor chosen for the purposes of illustration is of the four-wheel type. The tractor shown has a longitudinal or fore-and-aft body 20 carried at its rear end by means of a rear axle structure 22 by and between right- and left-hand rear traction wheels 24 and 25 and at its front end by steerable wheel means including a transverse axle 26 and right- and left-hand steerable wheels 28 and 29.

The front axle structure includes steering mechanism of the type in which the right and left front wheels are individually mounted on upright spindles 30 and 31 respectively. As is conventional, each spindle has a rearwardly extending steering arm, such as shown at 32 for the right-hand spindle 30, and these arms are cross connected by a tie rod 34. As is also conventional, the right-hand steering arm 32 continues forwardly and then inwardly as a steerable arm 36 and its free end is articulately connected to a fore-and-aft extending drag link 38. The drag link is moved fore-and-aft by a steering wheel 40 located at the rear end of the tractor in convenient proximity to an operator's seat 42. A representative type of steering mechanism of the character illustrated generally here and described above forms the subject matter of the U. S. Patent to McCray 1,873,447. Any other specific type of mechanism could be used. The operation of the steering mechanism will be understood to include rotation of the steering wheel 40 to change the course of travel of the tractor by causing the right and left-hand steerable front wheels to depart simultaneously to one side or the other from a straight-ahead position, the spindle 30 turning about its upright axis and the steerable arm 36 consequently traveling in an arc about that axis.

The tractor shown is power-take-off equipped, the power take-off in the present case being represented by a belt pulley 44 deriving power from the tractor driving mechanism (not shown) in any suitable manner, such as illustrated in the U. S. Patent to McCormick 2,103,543. These details are largely immaterial.

The harvester- or implement-supporting frame is designated generally by the numeral 46. This frame is an elongated structure of inverted U-shape as seen from the front or rear and has an upper elongated bight or top portion 48 and right and left ends defined by right and left depending legs 50 and 51, these legs respectively journaling on upright axes right and left caster supports 52 and 53 for right and left dirigible wheels 54 and 55 that sustain the frame 46. The frame 46 is appropriately constructed of separate members of adequate section to give the frame its inverted U-shape and to achieve the necessary relatively light weight and great strength.

The frame 46 is provided at its right end with rearwardly extending rigidly attached upper and lower members 56 and 58 that are of triangular shape and that have their apices respectively providing upper and lower vertically aligned pivots 60 and 62. Similar structure exists at the left-hand end of the frame 46, represented by upper and lower triangular brackets or members 57 and 59, affording left-hand upper and lower pivots 61 and 63.

The frame 46 is arranged ahead of the tractor with its length crosswise of the tractor and with its left end or leg 51 proximate to and its right end or leg 50 laterally remote and rightwardly from the tractor. As best seen in Figures 4 and 7, the arrangement of the frame relative to the tractor is such as to dispose the vertical axis of the left-hand pivots 61 and 63 substantially in fore-and-aft alinement with the right-hand front wheel 28, so that the frame 46 projects predominately to the right in what may be termed a first operating position. In addition to its support on the wheels 54 and 55, the frame 46 is connected to the tractor for travel therewith. The connection between the tractor and the frame 46 is accomplished by means comprising a fore-and-aft extending thrust frame designated generally by the numeral 64. The thrust frame has a rear end 66 articulately connected to a rear under portion of the tractor 20 intermediate the rear traction wheels 24 and 25, and the front end of the frame is bifurcated to provide upper and lower portions or furcations 68 and 70 that are vertically spaced apart on the order of and respectively pivotally connected to the left-hand triangular brackets 57 and 59 by the vertically aligned pivots 61 and 63, as previously described. The means for articulately connecting the rear end 66 of the thrust frame 64 to the tractor body is shown in Figure 12, wherein it will be seen that the right-hand portion of the transverse axle structure 22 has a rearwardly extending member 72 to which is bolted a depending bracket 74. This bracket has at its lower end a ball 76 that receives and cooperates with a socket 78 at the thrust frame rear end portion 66. The mounting of the thrust frame in the manner just described is such as to enable the thrust frame to move vertically relative to the tractor, which is important when it is considered that the harvester-supporting frame 46 is ground-supported on the dirigible wheels 54 and 55, which wheels may encounter terrain different from that encountered by the tractor wheels 24 and 25 and 28 and 29. The front end portions or furcations 68 and 70 are rigidly maintained in vertically spaced relation by an upright member 80.

In order that the rear pivot 76, 78 may be accommodated just to the left of the right rear wheel 24 and the interconnecting pivots 61, 63 between the frames 46 and 64 may be accommodated just to the left of the right front wheel 28, it is expedient to shape the thrust frame 64 as best shown in Figures 4 and 7, thereby avoiding interference between the thrust frame and the right front wheel 28. For this purpose, the thrust frame extends forwardly and to the right, as at 82, being laterally offset to pass around the right front wheel 28, continuing thence inwardly and to the left and forwardly as at 84 to dispose the pivot-receiving front ends of the portions 68 and 70 on the vertical axis already described. This offset not only accommodates the presence of the wheel 28, but it eliminates possible interference between the thrust member 64 and the steering mechanism for the wheels 28 and 29.

Vertical movement of the frames 46 and 64 in unison is controlled or guided by stabilizing means designated generally by the numeral 86. This means comprises a bar having its front end 88 pivotally connected at 90 to a pair of ears 92 that are rigidly secured to the upright member 80 between the thrust frame front portions 68 and 70. The stabilizer means has a rear end 94 articulately connected to the front end of the tractor by means of a universal joint 96. This means comprises a bracket 98 bolted at 100 to a central portion of the tractor front axle 26 and apertured to receive a transverse pin 102 (Fig. 8). This pin carries a yoke 104 which is apertured at 106 to receive the rear end 94 of the stabilizer 86, and is interiorly hollow at 108 to journal a thrust collar 110 that is removably pinned to the end 94 of the stabilizer 86 as at 112. Thus, movement of the thrust frame 64 about the pivot at its rear end is substantially vertical, because of the pivot at 90 and the universal joint at 96 for the stabilizer 86, and undesirable lateral displacement of the thrust frame, and consequently of the harvester-supporting frame 46, is prevented. Vertical loads on the harvester-supporting frame 46 are taken by the dirigible wheels 54 and 55. The bracing strength of the thrust frame 64 is accomplished by the vertically spaced portions 68 and 70, which take fore-and-aft twisting stresses imposed by any tendency of the frame 46 to rock about a transverse axis. Because of the guiding and strengthening function of the stabilizer 86, it may be referred to as a first brace means, in addition to brace means to be presently described.

During the major portion of the travel of the tractor-propelled frame 46, the frame 46 will lie crosswise of the direction of travel, assuming the position shown in Fig. 7 or as shown in full lines in Fig. 4. However, when it is necessary to turn corners, it is desirable to make provision for pivoting or swinging of the frame 46 about the vertical pivot axis at 61, 63. For this purpose, there is interconnected between the tractor and the frame 46 positioning means designated generally by the numeral 114. As illustrated here, the positioning means is in the form of a selectively immobilizable, extendible and retractable brace means comprising first and second relatively telescopically arranged tubular members 116 and 118. The member 118 has a forward end 120 pivotally connected to the right-hand lower triangular bracket 58 by the previously described lower vertical pivot 62. The structure of the front end portion of the member 118 is in the nature of a bifurcation, of which the portion 120 provides a lower furcation and an upper furcation is provided by an upper portion 122 adequately rigidified with respect to the portion 120 by a rigid upright 124 and pivotally connected to the upper vertical pivot 60, thus affording a pivot on a vertical axis between the right end of the frame 46 and the front end of the positioning or second brace means 114.

The member 116 has a rear end portion 126 that reacts against the tractor through the intermediary of the thrust frame 64, the portion 126 having an articulate connection by means of a vertical pivot 128 to a pair of vertically spaced plates 130 that are welded to a somewhat rearward portion of the thrust frame 64.

The positioning means 114 is power-operated and derives its power from the tractor. For this purpose, power-operated means, here a fluid motor 132, comprising a cylinder 134 and a piston (not shown) having a piston rod 136, is enclosed in the tubular portion or housing afforded by the tubular structure of the brace means members 116 and 118. The cylinder 134 is anchored at one end within the front tubular member 118 by an anchor pin 138 and the rear end of the piston rod 136 is similarly anchored at 140 to an intermediate portion of the rear brace member 116.

It will be readily seen that when the fluid motor 132 is extended (full lines in Fig. 4) the positioning or brace means 114 will be extended and consequently will maintain the transverse or crosswise operating position of the implement-supporting frame 46 as long as the motor 132 is immobilized or de-energized. When the motor 132 is energized for retraction, it will shorten the brace means 114 and consequently will swing the supporting frame 46 rearwardly and to the left about its pivot axis 61, 63 as indicated in dotted lines in Fig. 4. Conversely, when the motor 132 is re-energized or reversed for extension from its contracted position, the supporting frame 46 will be returned to its crosswise position. The motor 134 therefore has the characteristics of reversibility, being forcibly contractible as well as forcibly extendible. At the same time, it is immobilizable or de-energizible to retain the crosswise position of the frame 46. This selective control of the motor 132 is accomplished by a fluid pressure circuit which selectively supplies fluid to opposite ends of the cylinder 134 by fluid-pressure-transmitting lines 142 and 144. When the circuit is controlled so as to lock fluid at opposite ends of the piston within the cylinder 134, the motor 132 is de-energized or immobilized for purposes of accomplishing the same characteristics as to the positioning means 114 in general. That is to say, the hydraulic lock created in the motor 132 serves as a releasable lock for holding the positioning means 114 against telescoping retraction.

One of the frames, in this case the main or supporting frame 46, carries a drive mechanism mount, designated generally by the numeral 146, for supporting drive means for powering the fluid motor 132 as well as for powering and driving other drivable parts to be presently described. The mount 146 comprises a casing 148 to which is rigidly secured a coaxial tubular support 150, and journaled in the casing and support is an upright drive or input member in the form of a shaft 152. The mount 146 is carried by the frame 46 by means of a transverse pivot 154 which enables the entire mount to be moved fore-and-aft relative to the frame 46. This movement is important for the purpose of effecting tightening and loosening of a drive belt 156 that is trained about the tractor power take-off belt pulley 44 and about an input sheave or pulley 158 that is keyed to the upper end of the input or drive shaft 152. The position of the mount 146, as respects its relationship to the tractor belt pulley 44, is under control of adjusting means including over-center toggle mechanism, designated generally by the numeral 160, carried by a support 162 that extends forwardly from the upper part 48 of the supporting frame 46 (Fig. 5). The toggle mechanism comprises front and rear links 164 and 166 which have their proximate ends pivotally interconnected at 168. The rear end of the rear link 166 is pivoted at 170 on the support 162 and the front end of the front link 164 carries a transverse pin 172 that is capable of running back and forth in a rearwardly and upwardly inclined slot 174 in the forward portion of the support 162. It will be understood that the support 162 is in the form of a channel in cross section and that it has opposite sides, each of which is provided with a slot such as the slot 174, but since these details are immaterial they are not elaborated.

The support 162 carries therein a transverse rockshaft 176 to the outer or left-hand end of which are rigidly welded upper and lower control arms 178 and 180 and to the other end of which is rigidly welded an actuating arm 182. A center link 184 is connected at one end to the links 164 and 166 by the previously described pin 168 and is pivotally connected at its other end at 186 to the free end of the actuating arm 182. When the rockshaft 176 is in the position shown in full lines in Fig. 5, the toggle established by the links 164 and 166 is slightly over center below a straight line drawn between the pivot 170 and the pin 172. Thus, the pin 172 is forced to the forward end of its slot 174 and further downward movement of the linkage is prevented by a stop 188. As the pin 172 moves forwardly and downwardly in the slot 174, it exerts a forward force on a spring connection 190 between the pin 172 and a collar 192 secured to the upper end of a tubular support 150 of the drive mechanism mount 146. This swings the drive mechanism mount forwardly about its pivot 154 on the supporting frame 46 and tightens the drive belt 156. Control of the rockshaft 176 is effected by means of upper and lower flexible members such as ropes 194 and 196 connected respectively to the upper and lower control arms 178 and 180 and running rearwardly to a convenient position adjacent to the operator's seat 42 on the tractor. These ropes may be selectively pulled to rock the rockshaft 176 in the desired direction. Rocking of the rockshaft 176 in a counterclockwise direction, as viewed in Fig. 5, breaks the toggle by forcing the pivot point 168 upwardly and allowing the spring 190 to draw the pin 172 upwardly and rearwardly in the slot 174, thus decreasing the distance between the belt pulley 44 and the input pulley 158 which results, of course, in slackening the belt 156 and discontinuing drive to the upright shaft 152. The broken lines in Fig. 5 illustrate the released or broken position of the toggle means 163.

The lower end of the casing 148 of the drive mechanism mount 146 carries a pump 198 comprising a pump casing 200 and internal pump mechanism 202, which may be of any suitable type, the details of which are not important here. This pump, together with a reservoir tank 204 and a valve 206, represents a fluid-pressure source for the motor 132 of the frame-positioning means 114. The tank 204 is appropriately carried by the front end portions 68 and 70 of the thrust frame 64, as by brackets 208 (Fig. 3) and an intake line 210 runs from the bottom of the tank to the inlet side of the pump 198. A high-pressure line 212 leads from the pump to the valve 206. A return line 214 leads from the valve to the tank 204.

The hydraulic system is thus entirely divorced from the tractor and all of its components are carried on the attachment frame, which is consistent with the design of the machine as an attachment for the tractor. Moreover, the arrangement eliminates the need for excessively long conduits which would be the case if the hydraulic power were derived directly from a pump on the tractor itself, which is somewhat conventional for agricultural machines in general. However, in its broadest aspects, the invention contemplates the utilization of hydraulic means other than that illustrated, as well as contemplating the use of power means other than hydraulic. Nevertheless, in its specific aspects, the means disclosed is specifically novel and is ideally suited for an implement or machine of the attachment nature.

The valve 206 is a dual valve, comprising upper and lower valve members 216 and 218. The area of present concern is the lower valve 218 and therefore the upper valve member 216 will be temporarily ignored.

As best shown in Fig. 9, the lower valve member 218 is slidable in a valve bore 220 with which are associated motor ports 222 and 224, a high-pressure inlet 226 and tank ports 228 and 230. The inlet 226 is connected to the high-pressure inlet line 212, as is a branch 232 which leads to a passage 234 in common with the tank port 228. The motor ports 222 and 224 are connected to the motor lines 142 and 144, previously described, that lead to the positioning means motor 132. The passage 234 and ports 228 and 230 lead to the common return line 214.

When the toggle mechanism 160 is set as shown in full lines in Fig. 5, the belt between the belt pulley 44 and the input pulley 158 is tightened, resulting in rotation of the input or drive shaft 152 and consequently effecting driving of the pump 198. The pump circulates fluid at no appreciable pressure to the valve 206 as long as the valve member 218 is in neutral, since the high-pressure line 212 leads to the return line 214 via the passage 234 and tank port 228. At the same time, portions of the valve 218 block the motor ports 222 and 224, thus establishing a hydraulic lock on the positioning means motor 132 and consequently immobilizing the positioning means to retain the frame 46 in its crosswise or transverse position as illustrated in full lines in Fig. 4 and as illustrated generally in Figs 1, 2, 3 and 7. When the valve member 218 is shifted rearwardly, the high-pressure inlet 226 is connected to the motor port 224 to supply fluid under pressure to the rear end of the cylinder 134 of the motor 132, thereby causing the motor 132 to retract the positioning means 114 and effecting rearward and leftward swinging of the frame 46 to the dotted-line position of Fig. 4. At the same time, the motor port 222 is connected to the tank port 230 and exhaust fluid from the other end of the motor 132 returns through the line 142 and leads ultimately to the reservoir tank 204. Shifting of the valve member 218 in the opposite direction from its neutral position as illustrated in Fig. 9 results in extension of the motor 132 and positioning means 114 and this extension restores the frame 46 from its dotted-line position of Fig. 4 to its full-line position, circulation of fluid being this time from the high-pressure inlet 226 to the motor port 222 and return fluid from the line 144 entering the motor port 224 and passing to the tank port 228. The motor 132 is thus of the two-way type, being capable of extension and retraction. As already indicated, when the valve member is in its neutral position as illustrated in Fig. 9, both motor ports 222 and 224 are blocked, thus establishing a hydraulic lock on the motor 132 which de-energizes or immobilizes the positioning means 114, serving as a releasable lock for retaining the positioning means extended so as to retain the crosswise position of the frame 46. Because the motor 132 is of the two-way type, as already explained, it is energizable and de-energizable as well as being reversible, thus constituting forcible means for extending and retracting the positioning means 114, affording a flexible and adequately powered control for changing the position of the frame 46 in accordance with operational necessities.

The invention features actuation of the valve 218 in response to steering of the tractor front wheels 28 and 29. The present embodiment of the invention is based upon the desirability of making only right turns, which follows from the conventional practice, previously outlined herein, of mowing in which all corners are turned to the right. Accordingly, the power-operated control means, utilizing the positioning means 114, the control valve 218 and associated components, is designed to effect swinging of the frame 46 rearwardly and to the left as the tractor front wheels are turned to the right from their straight-ahead position. When the tractor front wheels are brought back to their straight-ahead position, the frame 46 is returned to its crosswise operating position. However, when the tractor front wheels 28 and 29 are turned to the left from their straight-ahead position, the position of the frame 46 is not altered.

The foregoing is accomplished by adjustment of the valve member 218, which represents a first control member, by means of a second control member, designated generally by the numeral 236, connected between the valve member 218 and the right-hand tractor front wheel steerable arm 36. The interconnection between the valve member 218 and the second control member 236 comprises a valve-actuating lever 238 fulcrumed intermediate its ends on an upright pivot 240 by means of a bracket 242 carried by the harvester frame 46, being mounted on the lower triangular member 59 as best shown in Figs. 5 and 9. The lever 238 is connected at its right-hand end by a pin and slot connection 244 to the front end of the valve member 218 and is connected at its opposite or left-hand end by a pivotal connection 246 to the front end of the steering control link or member 236. Connection of the rear end of the link 236 to the steerable arm 36 of the tractor is effected by lost-motion or overrunning means 248 and a mounting arm 250.

The arm is suitably attached to the steerable arm 36 (Fig. 10) and has its rear end connected by a ball and socket joint 252 to an elongated cylinder 254 which forms part of the means 248. The cylinder 254 is closed at its opposite ends at 256 and 258, except that the closure 258 has an aperture therein to receive the rear end of the link 236. This link has within the cylinder 254 a piston 260 which is opposed from opposite sides by cylinder-contained coil springs 262 and 264 that respectively afford front and rear yielding means. When the tractor steerable front wheels 28 and 29 are in their straight-ahead position, adjustment of the control mechanism is such that the piston 260 occupies a position centrally between the rear and front ends 256 and 258 of the cylinder 254. The springs 262 and 264 are of equal bias to maintain the normally centered position of the piston 260.

Since the arm 250 is rigidly mounted on the steerable arm 36 it becomes in effect a part of the steerable arm and therefore moves in an arc 266 about the upright axis of the right-hand wheel spindle 30. Since the ball and socketed connection 252 between the arm 250 and means 248 establishes the pivotal connection between the two, the arcuate path 266 will be taken as the path of that pivotal connection.

Fig. 9 illustrates the related parts in a position in which the wheels 28 and 29 are straight ahead and the frame 46 is in its crosswise or transverse position. The valve member 218 is in its neutral position. Points A and B on the arc 266 represent points equidistant along the arc 266 at opposite sides of the center or neutral position of the pivotal connection 252. When the tractor front wheels are turned from the straight-ahead position to their right-turn position, the point 252 travels to the point A. When the steerable wheels are returned to their straight-ahead position from their right-turn position, the point 252 returns from A to the neutral position of Fig. 9. During this phase of steering, it will be noted that the movement of the point 252 from its neutral position to the point A is substantially fore-and-aft, thus causing fore-and-aft shifting of the control link 236, which shifting is translated through the lever 238 to the valve 218. However, if the wheels 28 and 29 of the tractor are turned to the left from the straight-ahead position of Fig. 9, the point 252 travels along the arc 266 to the point B and back from the point B to the neutral position when the wheels are returned from their left-turn position to the straight-ahead position. During this portion of travel, the corresponding portion of the arc 266 is substantially transverse and the fore-and-aft movement is very little as compared with the fore-and-aft movement of the point 252 when it moves to and from point A. Because of lost motion, tolerances and the action of the means 248, the slight fore-and-aft movement that may occur as the point 252 moves to and from the point B is not sufficient to change the position of the valve 218. Accordingly, the valve member 218 will be actuated only on right turns but not on left turns, which, as explained above, is desirable in the machine of the type illustrated.

As the corner of the field is approached, the tractor front wheels 28 and 29 will be steered to the right to their right-turn position. This will cause the point 252 to move forwardly to the point A and will thus exert a forward force through the link 236 on the valve-control lever 238, rocking this lever in a clockwise direction as viewed in Fig. 9, thereby shifting the valve 218 to the rear to supply fluid under pressure from the inlet 226 to the motor port 224 and thence via the line 144 to the rear end of the cylinder 134 of the motor 132. This results in retraction of the positioning means 114 and causes the frame 46 to swing to the dotted-line position as represented in Fig. 4. In this respect, it is important to note another characteristic of the invention, which resides in means for automatically returning the valve member 218 to its neutral position when the frame 46 has been swung rearwardly to the dotted-line position of Fig. 4. This results from the mounting of the fulcrum or pivot 240 for the valve control lever 238 on the frame 46 rather than on the thrust frame 64. Consequently, the fulcrum 240 is swingable about the main pivot point 61, 63 and as it does so it swings forwardly relative to the rearwardly positioned valve 218. When this occurs, the point 246, that establishes the pivotal connection between the lever 238 and the front end of the steering control link 236, serves as a fulcrum about which the lever 238 swings forwardly, thus pulling the valve member 218 with it and returning the valve member to neutral. Therefore, the maximum right-turn position of the frame 46 can be accomplished without the necessity of relying on a relief valve, which would be necessary in those cases in which the main control valve is not automatically returned to neutral.

After the right turn has been completed and the wheels 28 and 29 of the front end of the tractor are returned to their straight-ahead position by steering them to the left from their right-turn position, the point 252 moves from the point A on the arc 266 back to the neutral position of Fig. 9, exerting a rearward force on the valve lever 238 to rock this lever in a counterclockwise direction as viewed in Fig. 9, following which the valve member 218 is shifted forwardly to connect the high-pressure line 226 to the other motor port 222, therefore supplying fluid under pressure through the line 142 to the front end of the cylinder 134 of the motor 132 in the positioning means 114. The positioning means is then caused to extend and it returns the frame 46 to its crosswise position. As the frame 46 reaches its crosswise position, the fulcrum 240 for the lever 238 is moving rearwardly relative to the valve 206 and, again fulcruming on the point 246, forces the valve member 218 rearwardly to its neutral position. Again, return of the valve member 218 automatically to neutral is relied upon as means for de-energizing the power means and reliance need not be placed on relief valves as previously indicated.

The centering or lost-motion means 248 serves several functions. One of these is the accommodation of overtravel for the point 252 as it moves to points A or B, as compared with the relatively short range of movement of the valve member 218. That is to say, the range of movement of the point 252 is considerably greater than the range of movement of the valve 218. Thus, when the valve member 218 reaches the end of its movement in either direction, one or the other of the springs 262 or 264 will compress and allow excess movement of the point 252. Moreover, the springs 262 and 264 are initially unstressed and a certain amount of steering movement of the wheels 28 and 29 of the tractor is permitted without changing the position of the valve member 218. This is to accommodate minor deviations from straight-ahead travel of the tractor and implement during operation thereof. This slight lost motion further accommodates the no-change status of the valve member 218 during left-hand steering of the tractor wheels from their straight-ahead position, thus rendering unimportant the slight fore-and-aft distance between the neutral position of the point 252 and the point B. A preferred range of steering of the tractor wheels without affecting the valve member 218 is nine degrees to either side of the straight-ahead position.

The driving shaft 152 in the drive mechanism mount 146 is, as best noted in Fig. 4, proximate to the vertical pivot axis 61, 63. The fact that the shaft is slightly offset from the pivot axis 61, 63 is immaterial because of the spring-tensioning means afforded by the springs 190 that are associated with the toggle means 160. Consequently, the slight change in position between the shaft 152 and the pivot axis 61, 63 does not alter the driving status of the belt 158 during turning.

Although the frame 46 and the components by means of which it is propelled by the tractor are broadly useful with many types of implements, the construction is particularly useful with an implement of the header or windrower type. Such implement is illustrated as comprising a harvester or implement frame 268 of rectangular shape having a front leading edge portion 270, a rear trailing edge portion 272 and right- and left-hand ends 274 and 275, respectively. The frame is of elongated construction and lies parallel to the frame 46, being adapted in a normal straight-ahead operating position to lie, of course, transverse to the direction of travel. The left-hand end 275 of the frame 268 is proximate to the tractor left front wheel 29, and the right-hand end 274 of the frame is spaced rightwardly from the right-hand front wheel 28. The relationship between the ends 274 and 275 and the tractor wheels 28 and 29 will vary, of course, with the width of the frame 268. In the present instance, the length of the frame (its transverse operating width) is on the order of fourteen feet.

The windrower or harvester frame 268 is carried by the frame 46 for vertical adjustment relative to the frame 46. For this purpose, the frame 46 has right- and left-hand forwardly projecting mounting brackets 276 and 277 on which the windrower frame 276 is mounted by means of right- and left-hand supporting arms 278 and 279. Since only a portion of the right-hand arm 278 is visible (Fig. 3) and since the left-hand arm 279 appears somewhat in detail in Fig. 5, at least relative to its mounting on the frame 46, reference will be had to that disclosure for a detailed description. As will be seen in that figure, the pivotal connection between the left-hand windrower frame supporting arm 279 and the left-hand pivot bracket 277 on the frame 46 is a pivotal connection at 281, it being understood that a coaxial pivotal connection (not shown) is established between the right-hand arm 278 and right-hand bracket 276.

The right- and left-hand windrower frame supporting arms 278 and 279 respectively have rigidly secured thereto upstanding arms representing power-receiving parts 282 and 283. Power supplied to these parts serves to rock the windrower about its pivotal connection on a transverse axis to the supporting frame 46 and therefore to adjust the height of the leading edge frame portion 270 relative to the ground, which also adjusts the height of cut of cutting mechanism such as a conventional sickle bar 284, which here constitutes crop-collecting means for handling crops borne by the field over which the tractor and harvester travel.

A right-hand bell crank 286 is pivoted on the top member 48 of the frame 46 by an upright pivot 288. This bell crank has first and second arms 290 and 292 and the first arm is connected by a force-transmitting means in the form of a short chain 294 to the right-hand lift arm 292. A left-hand bell crank 287 is pivoted to the frame 46 on an upright pivot axis 289 and has first and second arms 291 and 293, the first arm being connected by force-transmitting means in the form of a short chain 295 to the left-hand lift arm 283.

The second arms 292 and 293, respectively, of the right- and left-hand bell cranks 286 and 287 are interconnected by a transversely extending link 296. A power lift device in the form of a fluid motor 298 of the cylinder and piston type has a cylinder member 300 anchored at 302 to the top member 48 of the frame 46 and a piston rod member 304 connected to the second arm 292 of the right-hand bell crank 286 in common with the right-hand end of the transverse link 296. The motor 298 is of the one-way fluid-pressure-operated type to which fluid is supplied by a fluid line 306 and when extended pivots the bell cranks 286 and 287 to exert a rearward or lifting force on the chain connections 294 and 295, thus tilting the windrower frame 268 rearwardly to elevate the cutting mechanism 284. When fluid is exhausted from the motor 298, the cutting mechanism lowers by its own weight, reversing the angular movement of the bell cranks 286 and 287. The supply of fluid to and from the motor 298 via the line 306 is under control of the upper valve member 216 in the previously described valve 206. The details of the upper valve member are unimportant and have not been illustrated. Suffice it to say that the valve 206 may be of the compound parallel type such as shown in the U. S. patent to Berglund 2,289,567, in which the high-pressure inlet, such as the inlet 226 previously described, is connected in parallel to one or more valve members such as the valve members 216 and 218 here. Any other suitable arrangement could be made, depending upon individual desires. The illustrated arrangement is deemed preferable for present illustrative purposes. The valve member 216 is, of course, slidable in a bore (not shown) to which fluid is supplied by the previously described pump 198 and the arrangement is such that operation of either of the motors 298 and 132 may be had without materially affecting the other.

Remote control of the upper valve member 216 from the operator's station is accomplished by means of a fore-and-aft extending control rod 308 having its forward end pivotally connected at 310 to a valve-actuating arm 312 that is fulcrumed on a vertical pivot 314 carried by the upright 80 between the front portions 68 and 70 of the thrust frame 64. The pivot mounting 314 for the valve lever 312 is on the thrust frame as distinguished from the mounting of the valve lever 238 for the lower valve member 216 on the frame 46. Automatic follow-up control for the lift valve member 216 is unnecessary.

Adjustment of the header or windrower frame 268 is facilitated by the use of counterbalance or assist springs 316 and 317. The rear ends of the controls 194, 196 and 308 are conveniently grouped (Fig. 1), the rolls being respectively guided through eyes 318 and 320 and the rear end of the control rod 308 being connected to a fore-and-aft rockable lever 322. Since the fulcrum 314 for the valve control lever 312 of the upper valve member 216 is mounted on the thrust frame, the position of the valve is not changed during swinging of the frame 46 relative to the thrust frame about the upright axis at 61–63.

A reel 324, of conventional construction, is journaled at its opposite ends on right- and left-hand reel supports 326 and 327 and cooperates with the sickle or cutting mechanism in a not unconventional manner to cause crops harvested by the sickle 284 to move rearwardly as the machine advances. It is conventional practice in windrowers to receive the harvested crops by some form of crop-moving device and to move the crops laterally for deposit in a windrow having a lateral dimension considerably narrower than the width of the associated cutting mechanism. In some types of windrowers, the crop-moving device is arranged so that the cut crop is moved to one side of the windrower frame and there deposited in a windrow. In other types of windrowers, the crop-moving device is divided into two separate units that operate simultaneously to move the crops toward a discharge opening intermediate the ends of the windrower frame. The windrower shown here is of the latter type and has right and left crop-moving devices 328 and 329. The left crop-moving device 329 may comprise a conventional endless canvas 331 trained at opposite ends about right and left rollers 332 and 333 (Fig. 11). The left-hand roller 333 of the device 329 is located proximate to the left end 275 of the windrower or harvester frame 268, and the roller 332, and the portion of the canvas trained thereabout, establishes a right delivery or discharge end 334 (Fig. 7) just to the right of a fore-and-aft upright plane including the right-hand face of the right tractor wheel 24. The canvas-carrying rollers 332 and 333 are driven so that the upper run of the canvas 331 travels to the right or in the direction of the arrow 335.

The right-hand endless conveyor or crop-moving device 328 is similarly carried on right and left rollers, only the left of which is visible at 337 (Fig. 11), but the presence of the right-hand roller will be appreciated from the location of the right-hand end of the device 328 adjacent to the right-hand end 274 of the harvester frame 268 (Figs. 1 and 7). The device 328 includes an endless canvas 330 trained about the rollers and the rollers are driven in such direction that the upper run of the canvas travels to the left or in the direction of the arrow 336 (Fig. 7). The roller 337, and the portion of the canvas 330 trained thereabout, defines for the right-hand crop-moving device 328 an inner or left-hand terminal or discharge or delivery end 339, which end lies in rightwardly spaced relation from the terminal delivery end 334 of the left-hand device 329. The delivery ends 334 and 339 of the crop-moving devices 329 and 328 define, together with the intermediate parts of the leading and trailing portions 270 and 272 of the frame that extend between these delivery ends, a crop-discharge opening 338. As best seen in Figs. 1 and 7, this opening lies rightwardly of the right-hand rear wheel 24 of the tractor and is thus to the right of the track of this wheel and therefore cannot be run over by the tractor. Since the tread or lateral spacing of the rear wheels 24 and 25 of the tractor is greater than that of the front wheels 28 and 29, the rear wheels are used as the critical portion of the tractor from which the opening 338 is spaced to the right. However, there may be instances in which the tread of the front wheels is wider, and it would be from the right-hand one of these wheels that the opening 338 would be spaced. In any event, the important factor to be considered is the movement of the devices 328 and 329 inwardly, as designated respectively by the arrows 336 and 335, to deliver crops through the discharge opening 338 in a windrow that cannot be run over by the tractor. It will be understood that as the machine moves forwardly, the sickle or cutting mechanism 284 will cut crops across its entire width and that right- and left-hand portions of the cut crops will fall respectively on the right- and left-hand devices 328 and 329, whereas a central portion of the crops, immediately ahead of the opening 338 will fall directly through the opening and back onto the ground. The resulting windrow will be, of course, on the order of the width of the opening 338, which is preferably approximately forty to forty-two inches; although, this dimension may be varied if desired. The dropping or forming of the windrow along the zone or line indicated permits the tractor to avoid this windrow on its next turn about the field.

The expedient of enabling the frame 46 to swing rearwardly and then back to its crosswise position as the tractor is turned to the right and then back to its straight-ahead position facilitates the turning of corners during the windrowing operation. Moreover, and what is of equal importance, is the ease with which a subsequent pickup machine may be operated over the same field to pick up the windrows formed by the present windrower. For example, it is common practice to equip a self-propelled combine with pickup means to gather windrows previously formed such as by a machine of the general character illustrated. Since self-propelled combines include the harvesting means and consequently the pickup means at the front, it is desired that the windrowing operation duplicate as closely as possible the pickup operation, at least as far as concerns the manner in which the two machines are driven over the field. Self-propelled combines are characteristically equipped with rear steerable wheels which enable them to turn shorter corners. The ability of the present frame 46 to steer with the tractor likewise enables the tractor-windrower to accomplish shorter turns and thus to effect square corners that may be relatively easily followed by a pickup-equipped combine of the character noted.

Fig. 11 is a schematic illustration of the manner in which the drivable parts, represented by the reel and sickle, of the harvesting mechanism are driven from the drive shaft 152. As shown in that figure, a twisted belt 340 is trained about a driven sheave 342 journaled centrally on the rear frame member 272 of the windrower frame 268 and about a driving sheave 344 that is keyed to an intermediate portion of the driving shaft 152. Coaxial with the sheave 342 and rotatable therewith is a second sheave 346 which, by means of a belt 348, drives a sheave 350 keyed coaxially to the roller 332 for the left-hand crop-moving device or conveyor 329. A sheave 352 is keyed coaxially to the left-hand roller 337 for the right-hand conveyor 328 and the sheave 352 is connected by a crossed belt 354 to a sheave 356 coaxial and rotatable with the sheave 350.

The left-hand roller 333 of the conveyor 329 is, of course, driven by the conveyor canvas 331 and that roller has coaxially keyed thereto a sheave 358 which serves as means for driving the reel 324. As best shown in Fig. 2, the left end 275 of the windrower frame 268 journals a short transverse shaft 360 on which are keyed a sheave 362 and a small sprocket 364. A drive chain 366 connects the sprocket 364 with a larger sprocket 368 keyed coaxially to the reel 324. A crossed belt 370 connects the sheaves 358 and 362, being trained over a pair of idler sheaves 372 in order to accomplish the necessary change in direction. A pitman 374 for driving the sickle 284 has a conventional eccentric 376 coaxial with the sheaves 342 and 346.

The manner of use and operation of the machine is deemed to be clear from the foregoing description and requires no further elaboration. Features of the invention not categorically enumerated herein will undoubtedly occur to those versed in the art, as will various modifications and alterations in the preferred embodiment of the invention disclosed, all of which may be achieved without departure from the spirit and scope of the invention.

What is claimed is:

1. For a tractor having a body carried at its rear end on right and left rear wheels and at its front on right and left steerable front wheels cross-connected by steering linkage: a harvester attachment comprising a thrust frame having a front end proximate to and ahead of the tractor right front wheel and a rear end articulately sustained on an under rear portion of the tractor body intermediate the tractor rear wheels to enable vertical movement of said thrust frame front end relative to the tractor; stabilizing means articulately interconnecting the front ends of the tractor and thrust frame for controlling said vertical movement; a harvester-supporting frame having right and left ends carried respectively on right and left dirigible wheels and arranged with its left end proximate to and its right end rightwardly remote from the front end of the thrust frame; means interconnecting said proximate ends of the frames for vertical movement in unison and including an upright pivot about which the harvester-supporting frame is swingable rearwardly and forwardly back to an operating position extending rightwardly of and generally normal to the tractor; controllable power-operated positioning means deriving power from the tractor and interconnecting the harvester-supporting and thrust frames for positioning the harvester-supporting frame in accordance with steering of the tractor front wheels, said power-operated means being selectively deenergizible, energizible and reversible to cause the harvester-supporting frame to respectively remain in, swing rearwardly from and return forwardly to its straight-ahead position in response to steering of the tractor front wheels, respectively, straight ahead, to the right and back to straight ahead, said power-operated means further including a steering-responsive element connected to the tractor front wheel steering linkage; and harvesting mechanism supported by and ahead of the harvester frame.

2. The invention defined in claim 1, in which: the thrust frame is laterally offset to the right intermediate its ends to pass to the right of the right front wheel of the tractor, and is further offset to the left forwardly of said first mentioned offset so as to dispose its front end just to the left as well as ahead of the tractor right front wheel; and the steering-responsive element lies just to the left of the tractor right front wheel and is connected thereat to the front wheel steering linkage.

3. For a tractor having a power-take-off equipped body carried at its rear end on rear weel means and at its front end on steerable wheel means and including steering mechanism for the steerable wheel means: an agricultural implement attachment comprising an elongated supporting frame having opposite ends and arranged normally in an operating position transverse to the tractor with one end proximate to and its other end laterally remote from the front end of the tractor; mounting means connecting the supporting frame at its tractor-proximate end to the tractor for travel of the tractor and frame together, said mounting means including an upright pivot adjacent to the tractor-proximate end of the frame and about which said frame may swing rearwardly from and forwardly back to said operating position; positioning means connected between the tractor and the supporting frame and selectively immobilizable to retain the supporting frame in its operating position and mobilizable to swing said frame from and back to said operating position; drivable mechanism carried on the supporting frame; drive means mounted on the supporting frame and including an upright driven member proximate to the upright pivot and drivingly connected to the tractor power take-off and to the drivable mechanism, said drive means further including power means driven by said upright driven member and selectively connectible to and disconnectible from the positioning means to incur mobilizing and immobilizing of said positioning means; and control means on the supporting frame and connected to the power means and to the tractor steering mechanism and operative to effect connection and disconnection of the power means for retaining and swinging of the supporting frame in accordance with steering of the tractor steerable wheel means.

4. The invention defined in claim 3, in which: the positioning means includes a selectively extendible and retractable fluid motor; the power means includes a fluid pump and a control valve therefor; and the control means includes a steering responsive element interconnecting the valve and the steering mechanism.

5. The invention defined in claim 4, in which: the motor is a cylinder and piston assembly extending diagonally rearwardly and toward the tractor between the tractor-remote end of the supporting frame and a rear part of the tractor; and telescopic brace means likewise extends diagonally as aforesaid and includes a tubular portion housing the cylinder and piston assembly.

6. For a tractor having a power-take-off-equipped body carried at its rear end on rear wheel means and at its front end on steerable wheel means and including steering mechanism for the steerable wheel means: an agricultural implement attachment comprising a supporting frame arranged normally in an operating position proximate to the front end of the tractor; mounting means connecting the supporting frame to the tractor for travel with the tractor, said mounting means including an upright pivot about which said frame may swing horizontally from and back to said operating position; positioning means connected between the tractor and the supporting frame and selectively immobilizable to retain the supporting frame in its operating position and mobilizable to swing said frame from and back to said operating position; drivable mechanism carried on the supporting frame; drive means mounted on the supporting frame and including an upright driven member proximate to the upright pivot and drivingly connected to the tractor power take-off and to the drivable mechanism, said drive means further including power means driven by said upright driven member and selectively connectible to and disconnectible from the positioning means to incur mobilizing and immobilizing of said positioning means; and control means on the supporting frame and connected to the power means and to the tractor steering mechanism and operative to effect connection and disconnection of the power means for retaining and swinging of the supporting frame in accordance with steering of the tractor steerable wheel means.

7. For a tractor having a power-take-off-equipped body carried at its rear end on rear wheel means and at its front end on steerable wheel means and including steering mechanism for the steerable wheel means: an agricultural implement attachment comprising a supporting frame arranged normally in an operating position proximate to the front end of the tractor; mounting means connecting the supporting frame to the tractor for travel with the tractor, said mounting means including an upright pivot about which said frame may swing horizontally from and back to said operating position; positioning means connected between the tractor and the supporting frame and selectively immobilizable to retain the supporting frame in its operating position and mobilizable to swing said frame from and back to said operating position; power-take-off-driven means selectively connectible to and disconnectible from the positioning means to incur mobilizing and immobilizing of said positioning means; and control means connected to the power means and to the tractor steering mechanism and operative to effect connection and disconnection of the power means for retaining and swinging of the supporting frame in accordance with steering of the tractor steerable wheel means.

8. A tractor-propelled harvester for a tractor having a fore-and-aft body carried on right and left wheels, comprising: an elongated harvester frame positioned ahead of and connected to the tractor for travel therewith, with its length crosswise of the tractor body and having right and left ends spaced remotely respectively to the right and to the left of the right tractor wheels, said frame having a front leading edge portion running from end to end thereof; laterally oppositely movable left and right crop-handling devices carried by the frame to the rear of the leading edge portion, said left device extending from the left end of the frame to a terminal discharge end approximately in fore-and-aft alinement with the tractor right wheel and said right device extending from the right end of the frame to a discharge end spaced to the right of the discharge end of said left device, said discharge ends and the part of the leading edge portion between them defining a crop-discharge opening; crop-collecting means extending along the leading edge portion and operative to cause crops to move rearwardly in part onto the right and left devices and in part directly into the discharge opening; and drive means connected to the devices and simultaneously driving the left device to the right and the right device to the left to move crops thereon into the discharge opening.

9. A tractor-propelled harvester for a tractor having a fore-and-aft body carried on right and left rear wheels and steerable front wheel means and including steering mechanism for the front wheel means, said harvester comprising: an elongated harvester frame disposed ahead of the tractor in an operating position with its length crosswise of the tractor body and having right and left ends spaced remotely respectively to the right and to the left of the right tractor wheels, said frame having a front leading edge portion running from end to end thereof; means connecting the frame to the tractor for travel of the two in unison and including an upright pivot about which the frame may swing rearwardly from and forwardly back to the aforesaid crosswise position; positioning means interconnecting the frame and the tractor steering mechanism and operative to position said frame in accordance with steering of the tractor front wheel means for holding the frame in said operating position while the tractor front wheel means is in straight ahead position and for swinging said frame rearwardly upon steering of the front wheel means to the right and for returning said frame forwardly to its operating position when the tractor front wheel means is returned to straight-ahead position; laterally oppositely movable left and right crop-handling devices carried by the frame to the rear of the leading edge portion, said left device extending from the left end of the frame to a terminal discharge end approximately in fore-and-aft alinement with the tractor right wheel and said right device extending from the right end of the frame to a discharge end spaced to the right of the discharge end of said left device, said discharge ends and the part of the leading edge portion between them defining a crop-discharge opening; crop-collecting means extending along the leading edge portion and operative to cause crops to move rearwardly in part onto the right and left devices and in part directly into the discharge opening; and drive means connected to the devices and simultaneously driving the left device to the right and the right device to the left to move crops thereon into the discharge opening.

10. The invention defined in claim 9, in which: the drive means has a power-receiving drive connection to the tractor and includes an upright drive member proximate to the upright pivot.

11. For a tractor of the type having a body carried at its front and rear ends respectively on right and left front and rear wheels and including a belt pulley projecting from its right side on a transverse horizontal axis intermediate its front and rear ends: an agricultural implement attachment comprising a supporting element proximate to the front end of the tractor and mounted on and for travel with the tractor; an implement-carrying frame element connected to the supporting element on an upright pivot affording fore-and-aft swinging of the implement-carrying frame element relative to the tractor and support element; positioning means cooperative between the elements for regulating said swinging of the implement-carrying frame element; drivable implement means on the implement-carrying frame; a drive mechanism mount carried on the supporting element on a transverse pivot for fore-and-aft positioning and journaling, a rotatable drive member on an upright axis proximate to the upright pivot axis; means drivingly interconnecting the drive member and the drivable means; means including an endless drive belt interconnecting the belt pulley and the drive member; and means connected to the drive mechanism mount for moving said mount and the drive member selectively forwardly and rearwardly about the transverse pivot to respectively tighten and loosen the drive belt.

12. For a tractor of the type having a body carried at its front end on front wheel means and at its rear end on right and left rear wheels and including a belt pulley projecting from its right side on a transverse horizontal axis intermediate its front and rear ends: an agricultural implement attachment comprising a supporting frame element proximate to the front end of the tractor and mounted on and for travel with the tractor; an implement-carrying frame element connected to the supporting frame element on an upright pivot affording fore-and-aft swinging of the implement-carrying frame element relative to the tractor and supporting frame element; positioning means cooperative between the tractor and the implement-carrying element for regulating said swinging of the implement-carrying frame element; drivable implement means on the implement-carrying frame; a drive mechanism mount carried on one of the frame elements on a transverse pivot for fore-and-aft positioning and journaling a rotatable drive member on an upright pivot axis proximate to the upright pivot axis; means drivingly interconnecting the drive member and the drivable means; means including an endless drive belt interconnecting the belt pulley and the drive member; and means connected to the drive mechanism mount for moving said mount and the drive member selectively forwardly and rearwardly about the transverse pivot to respectively tighten and loosen the drive belt.

13. The invention defined in claim 12, including: fluid-pressure-operated means connected to and for operating the positioning means; a fluid pump carried by the drive mechanism mount and connected to and driven by the drive member; and fluid-pressure-transmitting means interconnecting the pump and the fluid-pressure-operated means.

14. The invention defined in claim 13, including: an implement part carried on the implement-carrying frame element for adjustment relative to said element; fluid-pressure-operated means in addition to the aforesaid fluid-pressure operated means and connected to and for adjusting said part; and second fluid-pressure-transmitting means interconnecting the pump and the additional fluid-pressure-operated means.

15. For a tractor carried at its rear end on right and left rear wheels and at its front end on front wheel means: an agricultural implement attachment comprising: an inverted U-shaped supporting frame positioned ahead of the tractor and including an elongated bight portion arranged transversely of the tractor and right and left depending legs positioned respectively proximate to and remote from the right of the tractor front wheel means; right and left dirigible wheels carried respectively by the right and left legs and sustaining the frame; a pair of vertically spaced and alined pivots on the frame adjacent to the left leg; a pair of vertically spaced and alined pivots on the frame adjacent to the right leg; a fore-and-aft thrust frame having a rear end articulately connected to the rear end of the tractor for vertical movement relative to the tractor and having a bifurcated front end provided with vertically spaced furcations connected respectively to the left leg pivots on an upright pivot axis affording fore-and-aft swinging of the supporting frame relative to the tractor and thrust frame; stabilizer means articulately connecting the front end of the thrust frame to the tractor for controlling said thrust frame in its vertical movement; and selectively extendible and retractable brace means having a rear end articulately connected to the thrust frame rearwardly of the aforesaid upright pivot and further having a bifurcated front end provided with vertically spaced furcations connected respectively to the right leg pivots on an upright axis.

16. An agricultural implement attachment for a tractor having front and rear ends, comprising: an inverted U-shaped supporting frame positioned ahead of the tractor and including an elongated bight portion arranged transversely of the tractor and first and second depending legs positioned respectively proximate to and remote from the right of the front end of the tractor; first and second wheels carried respectively by the first and second legs and sustaining the frame; a pair of vertically spaced and alined pivots on the frame adjacent to the first leg; a pair of vertically spaced and alined pivots on the frame adjacent to the second leg; a fore-and-aft thrust frame having a rear end connected to the tractor and having a front end provided with vertically spaced pivot-receiving portions connected respectively to the first leg pivots on an upright pivot axis affording fore-and-aft swinging of the supporting frame relative to the tractor and thrust frame; first brace means connecting the front end of the thrust frame to the tractor for holding said thrust frame against excess lateral movement; and selectively extendible and retractable second brace means having a rear end connected to the thrust frame rearwardly of the aforesaid upright pivot and further having a front end provided with vertically spaced pivot-receiving portions connected respectively to the right leg pivots on an upright axis.

17. An agricultural implement attachment for a tractor having front and rear ends and a power take-off, comprising: a supporting frame connected to the tractor for travel therewith and positioned ahead of and crosswise of the tractor; an implement carried by and ahead of the frame for vertical adjustment and including a pair of power-receiving parts for effecting such adjustment; a pair of bell cranks spaced apart on the frame on the order of the spacing of the power-receiving parts and respectively pivoted to the frame on transversely spaced upright pivots, each bell crank having first and second arms; a pair of means respectively connecting the first arms of the bell cranks to the power-receiving parts; a fluid motor having a fixed member anchored to the frame between the bell cranks and a movable member connected to the second arm of one bell crank; a force-transmitting link interconnecting the second arms of the bell cranks; drive means on the frame, including a drive connection to the tractor power take-off; and a fluid pump carried by the frame and driven by the drive means and including a valve-controlled fluid connection to the motor.

18. An agricultural implement attachment for a tractor having front and rear ends and a power take-off, comprising: an elongated supporting frame positioned ahead of and with its length crosswise of the tractor; means interconnecting the frame and tractor for travel together, including an upright pivot affording fore-and-aft swinging of the frame relative to the tractor; means including a first fluid motor between the tractor and frame for selectively swinging and fixing the frame relative to the tractor; an implement carried by and ahead of the frame for vertical adjustment; means including a second fluid motor lying along the frame and interconnecting the frame and the implement for adjusting the implement; drive means on the frame, including a drive connection to the tractor power take-off and a fluid pump carried by the frame and driven by the drive means; and first and second control valves carried by the frame independently of the tractor and connected to the pump and respectively connected to the first and second motors.

19. For a tractor having a fore-and-aft body including steerable wheel means of the type including a steering arm adjustable through an arc about an upright axis for steering the wheel means to either side of a straight-ahead position: an agricultural implement attachment comprising a frame connected to the tractor for travel therewith and for adjustment relative to the tractor between first and second positions; power-operated means deriving power from the tractor and connected to the frame for effecting adjustment of the frame; and a control device on the frame for controlling the power-operated means to adjust the frame in accordance with steering of the tractor and arranged to swing the frame from its first position to its second position when the tractor wheel means is steered from its straight-ahead position to one side and to swing the frame back to said first position when the wheel means is steered back to its straight-ahead position, said control device including means preventing swinging of the frame beyond its first position when the wheel means is steered from straight ahead to the other side, said control device means including a fore-and-aft movable member on the control device in fore-and-aft spaced relation to the steering arm, and link means connected at one end to said member and at its other end to the arm at a point thereon which travels fore-and-aft on the arc of movement of the arm when the wheel means is steered to said one side and back to straight-ahead position and which travels transversely on the arc of movement of the arm when the wheel means is steered from its straight-ahead position to and from said other side.

20. An agricultural implement attachment for a tractor having steerable wheel means, comprising: a supporting frame connected to the tractor for travel therewith and for fore-and-aft swinging relative thereto between first and second positions; positioning means deriving power from the tractor and interconnecting the tractor and the frame for selectively swinging the frame; and control means connecting the positioning means and the steerable wheel means for controlling the positioning means to swing the frame in response to steering of the wheel means, said control means including a first control member movable through a predetermined range smaller than the range of steering of the steerable wheel means and a second control member having a lost-motion connection between the first member and the steerable wheel means to enable overrunning of the first control member by the steerable wheel means when the range of the latter exceeds that of the former.

References Cited in the file of this patent

UNITED STATES PATENTS

| | | |
|---|---|---|
| 1,400,861 | Burgess | Dec. 20, 1921 |
| 2,100,910 | Moyer | Nov. 30, 1937 |
| 2,492,223 | Jenson | Dec. 27, 1949 |

FOREIGN PATENTS

| | | |
|---|---|---|
| 72,432 | Norway | Aug. 11, 1947 |